(12) United States Patent
Brief et al.

(10) Patent No.: US 11,169,744 B2
(45) Date of Patent: Nov. 9, 2021

(54) BOOSTING READS OF CHUNKS OF DATA

(71) Applicant: Western Digital Technologies, Inc., San Jose, CA (US)

(72) Inventors: David C. Brief, Modiin (IL); Rotem Sela, Hod Hasharon (IL); Opher Lieber, Revava (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 31 days.

(21) Appl. No.: 16/836,679

(22) Filed: Mar. 31, 2020

(65) Prior Publication Data

US 2021/0303208 A1 Sep. 30, 2021

(51) Int. Cl.
*G06F 11/20* (2006.01)
*G06F 3/06* (2006.01)
*G06F 12/1009* (2016.01)

(52) U.S. Cl.
CPC .......... *G06F 3/0659* (2013.01); *G06F 3/0613* (2013.01); *G06F 3/0673* (2013.01); *G06F 12/1009* (2013.01); *G06F 2212/1024* (2013.01)

(58) Field of Classification Search
None
See application file for complete search history.

(56) References Cited

U.S. PATENT DOCUMENTS

| | | | |
|---|---|---|---|
| 2011/0099323 A1* | 4/2011 | Syu | G06F 12/0246 711/103 |
| 2019/0108131 A1* | 4/2019 | Lee | G06F 3/0631 |
| 2019/0205052 A1* | 7/2019 | Harris | G06F 3/0604 |
| 2020/0371908 A1* | 11/2020 | Cariello | G06F 3/064 |
| 2021/0004167 A1* | 1/2021 | Lee | G06F 3/0631 |
| 2021/0096984 A1* | 4/2021 | Luo | G06F 12/1054 |

OTHER PUBLICATIONS

JEDEC, "UFS Host Performance Booster (HPB) Extension", Solid State Technology Association, Version 1, Standard No. 220-3; www.jedec.org, Jan. 14, 2019 (34 pages).

* cited by examiner

*Primary Examiner* — Ryan Bertram
*Assistant Examiner* — Trang K Ta
(74) *Attorney, Agent, or Firm* — Patterson & Sheridan, LLP; Steven H. Versteeg

(57) ABSTRACT

Data may be read from a data storage device using host performance booster (HPB). An encoded HPB entry in a read command provides the PBA (Physical Block Address) as well as the run length. The LBA (Logical Block Address), PBA, and run length are placed in an HPB read buffer table. The HPB read buffer table is located in the host device. When the read command is received by the data storage device, the data storage device reads the LBA, transfer length, and HPB entry from the read command. The HPB entry contains the PBA for the LBA as well as the run length for the data to be read. For non-sequential reads, the HPB contains the LBA, transfer length, and reference to a write buffer table that is stored in the data storage device.

20 Claims, 6 Drawing Sheets

| LBA | PBA | RL |
|---|---|---|
| 1 | X | 8 |
| 2 | X+1 | 7 |
| 3 | X+2 | 6 |
| 4 | X+3 | 5 |
| 5 | X+4 | 4 |
| 6 | X+5 | 3 |
| 7 | X+6 | 2 |
| 8 | X+7 | 1 |
| 9 | Y | 1 |

FIG. 3A

| LBA | PBA | RL |
|---|---|---|
| 1 | X-7 | 8 |
| 2 | X-6 | 7 |
| 3 | X-5 | 6 |
| 4 | X-4 | 5 |
| 5 | X-3 | 4 |
| 6 | X-2 | 3 |
| 7 | X-1 | 2 |
| 8 | X | 1 |
| 9 | Y | 1 |

FIG. 3B

BOOSTING READS OF CHUNKS OF DATA

BACKGROUND

Field of the Disclosure

Embodiments of the present disclosure generally relate to reading data using host performance booster (HPB).

Description of the Related Art

Sequential access to a data file means that the computer system reads or writes information to the file sequentially, starting from the beginning of the file and proceeding step by step. Random access, on the other hand, means that the computer system can read or write information anywhere in the data file. In typical scenarios, about fifty percent of the reads are of a size 4K, but in many cases, random data of 8K-128K is read.

Flash management for translating the logical address of the data to the physical address on the flash is stored in tables saved in the flash translation layer (FTL). Flash management is typically performed at the granularity of 4K data units. The FTL tables are stored in a special area of the flash memory. A small cache is often kept in RAM on the data storage device to improve the random read performance. Storing the small cache necessitates a performance tradeoff on the random range supported. The larger the range, the more RAM that is needed. In cost sensitive devices, the random range is typically limited.

To factor this problem differently, the UFS (Universal Flash Storage) community has been working on methods to improve the random read performance by moving the cache to host memory. A large DRAM in the host device is more cost efficient than in the data storage device SRAM. To implement the DRAM cache, the HPB protocol has been defined. In the HPB approach, each 4K logical address has an associated 8B entry that provides the physical block address (PBA) on the media in a device proprietary format.

The data storage device is responsible for providing the 8 byte HPB entry for each 4K data unit. The host is then responsible for providing this 8 byte entry as part of the data read command. A limitation of this approach is that the approach only optimizes reads of 4K. Since a good percentage of random reads are greater than 4K, there is still room for improvement.

Therefore, there is a need in the art for an improved read using HPB.

SUMMARY

The present disclosure generally relates to using an encoded HPB entry in a read command to provide the PBA as well as the run length. The LBA (Logical Block Address), PBA, and run length are placed in an HPB read buffer table. The HPB read buffer table is located in the host device. When the read command is received by the data storage device, the data storage device will read the LBA, transfer length, and HPB entry from the read command. The HPB entry will contain the PBA for the LBA as well as the run length for the data that was written in flash. For reads of data that may not have been written sequentially, the HPB will contain the LBA, transfer length, and references to entries in a write buffer table that is stored in the data storage device.

In one embodiment, a data storage device comprises a memory device and a controller coupled to the memory device, where the controller is configured to create a host performance booster (HPB) read buffer table. The HPB table includes logical block addresses (LBAs), physical block addresses (PBAs), and run lengths for the PBAs, and deliver the HPB read buffer table to a host device.

In another embodiment, a data storage device comprises a memory device and a controller coupled to the memory device. The controller is configured to receive a host performance booster (HPB) read command, wherein the HPB command includes a run length that is not encrypted, review encoded information from HPB command, retrieve requested data, and deliver the requested data to a host device.

In another embodiment, a data storage device comprises a memory device, a controller coupled to the memory device, and means to create a host performance booster (HPB) read buffer table, where the HPB read buffer table includes a table of the 8-byte HPB entries, one per LBA.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3A is a schematic illustration of a HPB read buffer table according to one embodiment.

FIG. 3B is a schematic illustration of a HPB read buffer table according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to using an encoded HPB entry in a read command to provide the PBA as well as the run length. The LBA, PBA, and run length are placed in an HPB read buffer table. The HPB read buffer table is I in the host device. When the read command is received by the data storage device, the data storage device will read the LBA, transfer length, and HPB entry from the read command. The HPB entry will contain the PBA for the LBA as well as the run length for the data to be read. For non-sequential reads, the HPB entry sent with the command will contain references to one to eight entries in the HPB read buffer table according to the transfer length. The write buffer table is stored in the data storage device after specific write buffer commands.

Figure 1:
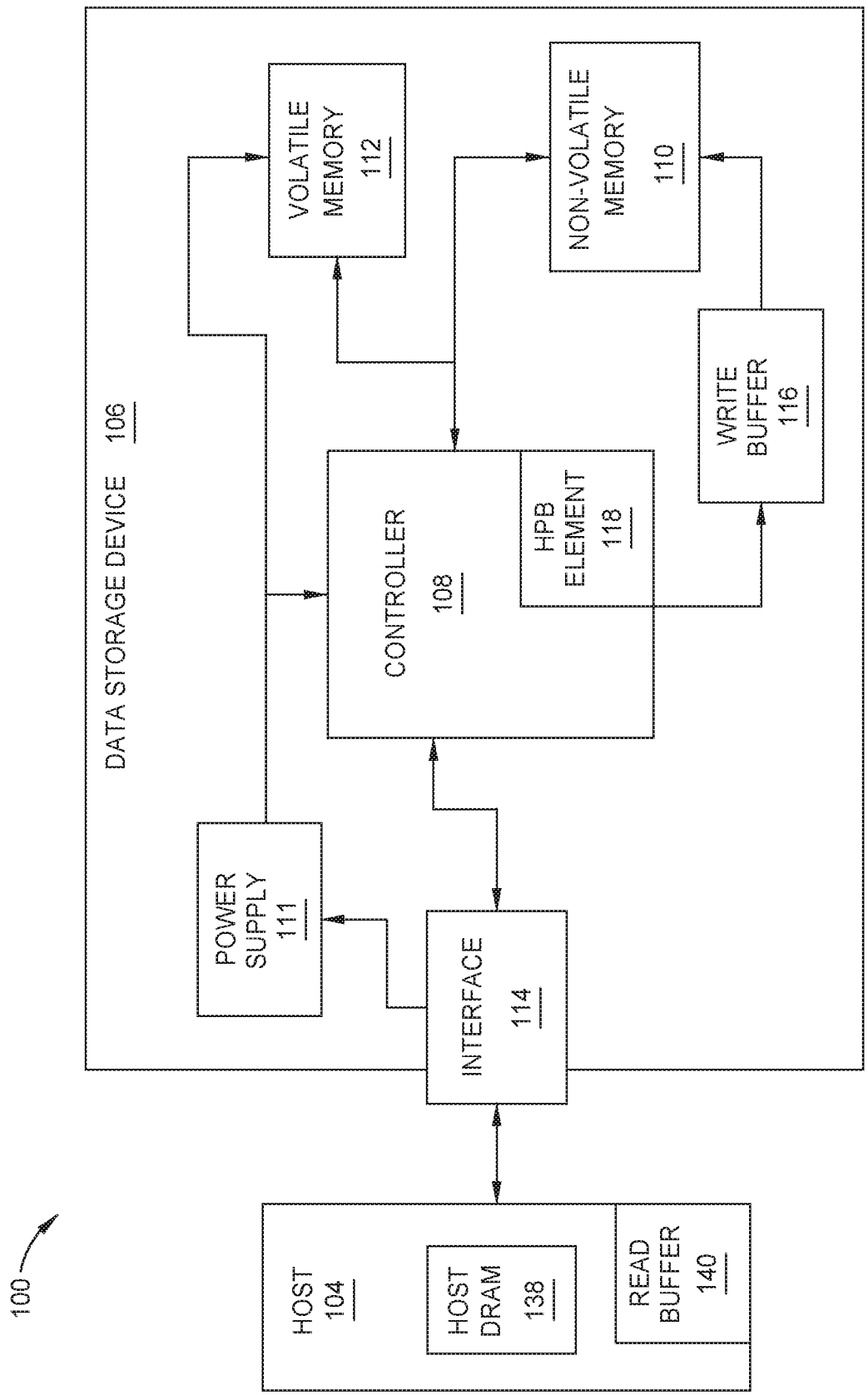
FIG. 1 is a schematic block diagram illustrating a storage system having a storage device that may function as a storage device for a host device, in accordance with one or more techniques of this disclosure.

FIG. 1 is a schematic block diagram illustrating a storage system 100 in which data storage device 106 may function as a storage device for a host device 104, in accordance with one or more techniques of this disclosure. For instance, the host device 104 may utilize NVM 110 included in data storage device 106 to store and retrieve data. The host device 104 comprises a host DRAM 138 that comprises a read buffer 140. The read buffer 140 may be used to store read commands to be sent to the data storage device 106 and may be utilized with a host performance booster (HPB) protocol. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The data storage device 106 includes a controller 108, non-volatile memory 110 (NVM 110), a power supply 111, volatile memory 112, an interface 114, and a write buffer 116. The controller 108 comprises a host performance booster (HPB) element 118. In one embodiment, the HPB element 118 is firmware that utilizes a HPB protocol to optimize reads in the data storage device 106. In another embodiment, the HPB element 118 is a hardware component of the controller 108. In some examples, the data storage device 106 may include additional components not shown in FIG. 1 for sake of clarity. For example, the data storage device 106 may include a printed board (PB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104. It is to be understood that while the description herein is made with reference to embedded flash devices that are in compliance with UFS protocol, it is contemplate that the embodiments discussed herein may be applicable to other standards as well, such as PCIe.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. It is to be understood that while the description herein is made with reference to HPB protocol for UFS devices that are intended for embedded flash memory, it is contemplate that the embodiments discussed herein may be applicable to other protocols as well, such as SCSI. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The data storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The data storage device 106 includes a power supply 111, which may provide power to one or more components of the data storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
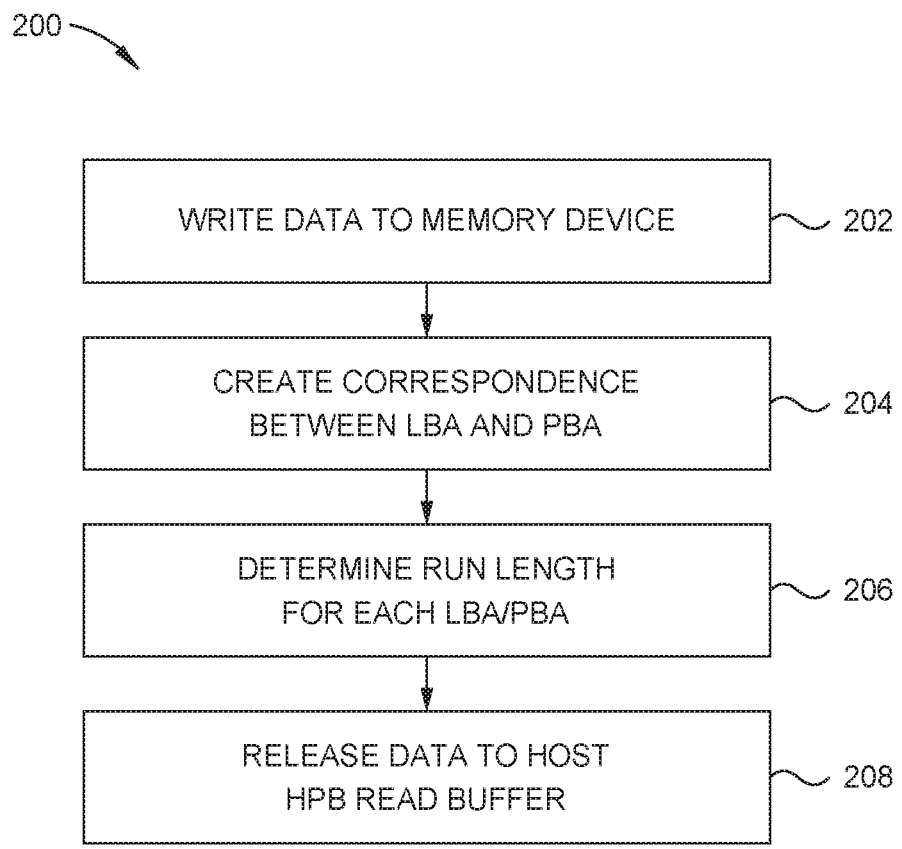
FIG. 2 is a flow chart illustrating a method of forming an HPB read buffer according to one embodiment.

FIG. 2 is a flow chart illustrating a method of forming a HPB read buffer according to one embodiment. The HPB read buffer may be the read buffer 140 of the host device 104 of FIG. 1. The HPB read buffer is a section of DRAM in a host device 104 that stores information, such as LBAs, PBA, and run length for data to be read. The HPB read buffer is a cache of an L2P map data of the logical block addresses (LBAs) of the NVM, such as the NVM 110 of FIG. 1, of the storage device, such as the data storage device 106 of FIG. 1. The volatile memory, such as the volatile memory 112 of FIG. 1, of a data storage device 106 is limited in capacity. Because of the storage capacity limitation, the L2P map of the data storage device 106 may not include the entire L2P information. However, the host DRAM, such as the host DRAM 138 of FIG. 1, has a larger capacity than that of the volatile memory 112 of the data storage device 106. The host DRAM 138 may store a complete L2P map of the LBAs stored in the NVM 110 of the data storage device 106 in the read buffer 140.

A write command is received by the controller, such as the controller 108 of FIG. 1, and is written sequentially to an available location in the NVM 110 at block 202. The location of the data corresponding to the write command is stored as a LBA in a L2P table of the volatile memory 112 of the data storage device 106. The controller 108 utilizes a HPB element 118 to create a correspondence between the LBA and the physical block address (PBA) at block 204. The PBA is the physical location of the data in the NVM 110, whereas the LBA is the logical location of the data in the NVM 110. The HPB element 118 calculates a run length (RL) for the host for each LBA and PBA correspondence. The run length is determined by the number of sequential data locations in the NVM 110. For example, if 6 LBAs (i.e., LBA0-LBA5) are sequential, LBA0 is associated with a RL of 6, LBA1 is associated with a RL of 5, and so-forth, where the last LBA, LBA5, associated with a RL of 1. The data (i.e., RL information) is released to the host HPB read buffer 140 at block 208. In one embodiment, the read buffer command is limited to about 32K.

FIG. 3A and FIG. 3B are schematic illustrations of a HPB read buffer table according to various embodiments. The HPB read buffer table may be stored in the read buffer 140 of the host DRAM 138 of FIG. 1. The HPB read buffer table comprises the LBA and PBA correspondence created in method 200 as well as the run length for each LBA and PBA correspondence calculated in method 200. The HPB table may have a maximum run length of about 16, of about 32, of about 64, of about 128, or about 256. The run length size may be a multiple of 4K size. The previous values for run length are not intended to be limiting, but to provide examples of possible embodiments. Furthermore, the HPB read buffer for each entry, such as LBA1, PBA X, and RL 8 of FIG. 3A corresponds to the LBA and HPB entry of the HPB read command.

FIG. 3A is a schematic illustration of a HPB read buffer table according to one embodiment. The run length of the HPB read buffer table is calculated counting forward. For example, a first LBA1 corresponds with a PBA X, while a second LBA2 corresponds with a PBA X+1, and so-forth. Each time the HPB element 118 of the controller 108 of FIG. 1 advances to the next LBA/PBA combination to determine a run length, the HPB element 118 reads each entry prior.

For example, in order to read LBA3 associated with X+2, LBA1 associated with X and LBA2 associated with X+1 are read. However, LBA1 associated with X and LBA2 associated with X+1 have already been read during a previous pass through. When the HPB element 118 recognizes that a non-consecutive LBA/PBA combination is in the list, the PBA entry resets so that a non-consecutive LBA9 refers to a PBA Y.

FIG. 3B is a schematic illustration of a HPB read buffer table according to another embodiment. The run length of the HPB read buffer table is calculated counting backwards. For example, a last LBA8 corresponds with a PBA X, while a second to last LBA2 corresponds with a PBA X−1, and so-forth. Unlike calculating counting forwards as referenced in FIG. 3A, counting backwards may not require repetitive reads to determine a run length. The DMA engine may enable the backwards run. For example, since the HPB element 118 of the controller 108 recognizes that the last LBA, such as LBA8 of FIG. 3B, is the last consecutive LBA in the table, the HPB element 118 utilizes logic to determine if the previous LBA in the table, such as the second to last LBA7, is equal to the current LBA minus 1. When the HPB element 118 recognizes that a non-consecutive LBA/PBA combination is in the list, the PBA entry resets so that a non-consecutive LBA9 refers to a PBA Y.

Figure 4:
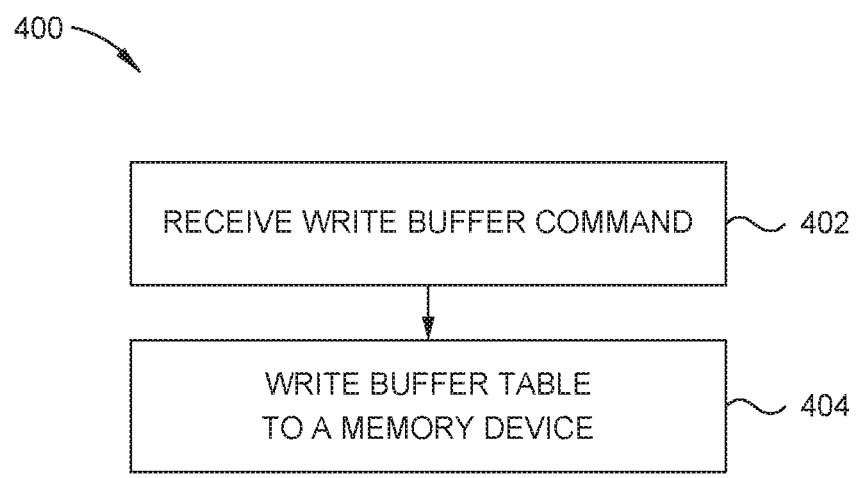
FIG. 4 is a flow chart illustrating a method of forming a HPB write buffer according to one embodiment.

FIG. 4 is a flow chart illustrating a method of forming a HPB write buffer according to one embodiment. The HPB write buffer may be the write buffer 116 of FIG. 1. A write buffer command is received from the host, such as the host device 104 of FIG. 1, at block 402. The write buffer command is associated with a portion of the HPB read buffer table that is relevant for non-consecutive reads. The write buffer command references the relevant HPB entry. The write buffer may be 2K bytes which is equal to about 256 entries of 8 bytes each. The write buffer references a portion of the read buffer table by the ID. If the read buffer is 8 bytes and each byte refers to 1 of the 256 entries of the write buffer, then each read buffer may contain up to 8 write buffer entries. Furthermore, the write buffer table is written to the write buffer 116 of a data storage device, such as the data storage device 106 of FIG. 1, at block 404.

Figure 5:
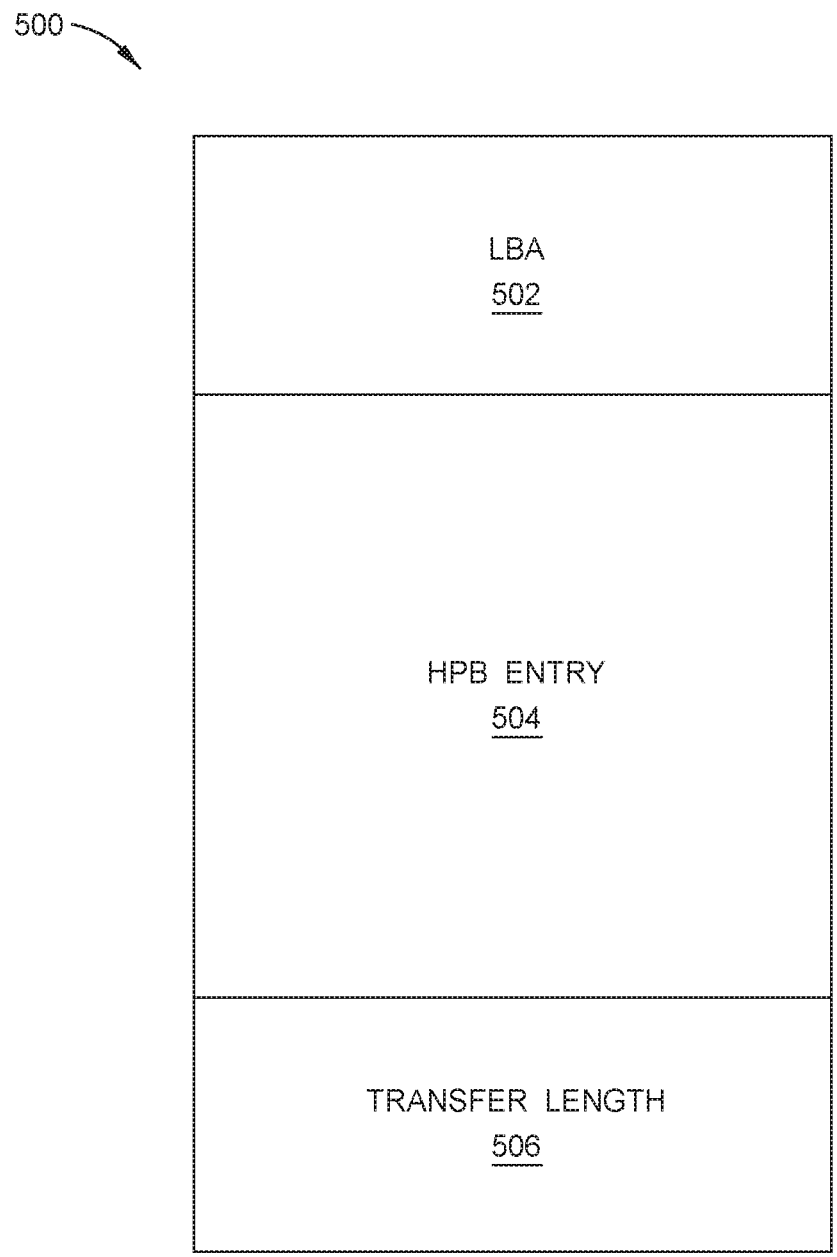
FIG. 5 is a schematic illustration of a HPB read command according to one embodiment.

FIG. 5 is a schematic illustration of a HPB read command according to one embodiment. The HPB read command is stored in a host read buffer, such as the read buffer 140 of the host DRAM of the host device 104 of FIG. 1. The HPB read command comprises of the following three parts: the LBA 502, the HPB entry 504, and the transfer length 506. The HPB read command is 16 bytes.

The LBA 502 is a 4 byte entry that corresponds to a relevant PBA of data. The LBA 502 signifies the location of where data is stored in the memory device. In one embodiment, the HPB entry is comprised of the PBA and the RL of the LBA/PBA correspondence. In another embodiment, the HPB entry comprises a pointer or direction to an HPB write buffer table. The HPB entry size is fixed and is about 8 bytes. Furthermore, if data is moved in the flash memory, the data will be moved in a group so that the order of the data remains sequential. However, if the data is not moved sequentially, the HPB read buffer table is updated and sent to the host. Anytime the data sequence is changed in the NVM, the host read buffer is updated with the updated HPB read buffer tables corresponding to the changed data sequence. The final 4 bytes of the HPB read command is associated with the transfer length 506 of the PBA. The transfer length 506 corresponds with the run length of the HPB read buffer. If the transfer length 506 is greater than the run length, then a standard flash read occurs. However, if the run length is equal to or greater than the transfer length 506, the data is read from the memory device using the HPB protocol without checking a flash translation layer (FTL) table. The size of the run length up to 256K bytes. The size listed is not intended to be limiting, but to provide an example of a possible embodiment.

For example, the HPB read command may be for LBA4 associated with a PBA X+3 as shown in FIG. 3A. If the transfer length 506 associated with the HPB read command is 5, then the host device, such as the host device 104 of FIG. 1, is able to read the LBA4 directly from the NVM by utilizing the appropriate HPB protocol without checking the FTL table. However, if the transfer length 506 associated with the HPB read command is 6, then the host device is unable to read directly from the NVM utilizing the HPB protocol. The data associated with LBA4 will be read utilizing the standard read protocol. Furthermore, the run length is visible to the host. Because the run length is visible to the host, the host may split up HPB read commands so that device may avoid doing a standard read and having to reference the FTL table.

Figure 6:
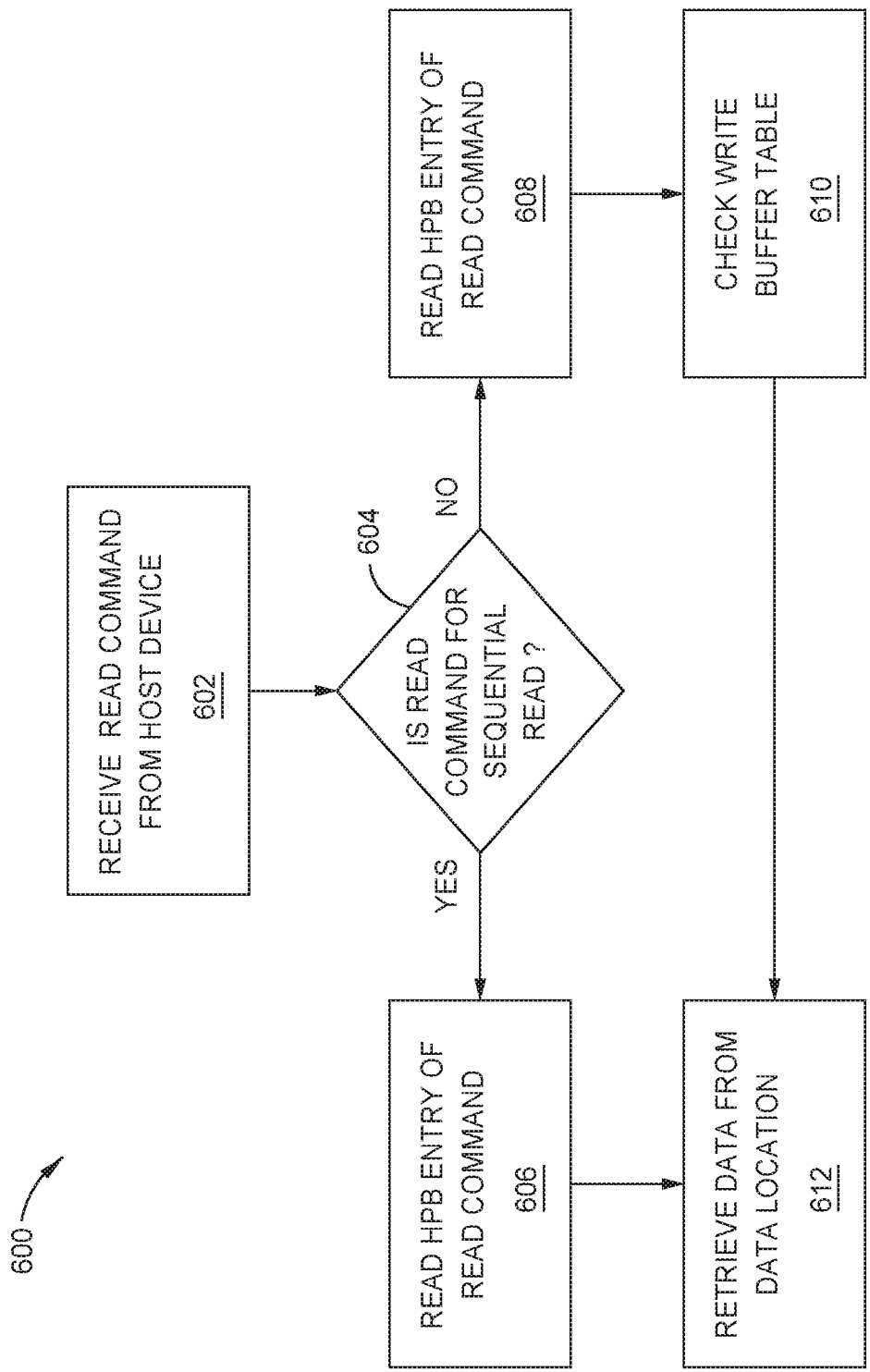
FIG. 6 is flow chart illustrating a method of processing a read command according to one embodiment.

FIG. 6 is a flow chart illustrating a method 600 of processing a read command according to one embodiment. The host device may be the host device 104 of FIG. 1. The HPB read buffer table may be the read buffer 140 of the host DRAM 138 of the host device 104 of FIG. 1. The write buffer table may be the write buffer 116 coupled to the HPB element 118 of the controller 108 of the data storage device 106 of FIG. 1. At block 602, the controller 108 receives a read command from the host device 104. The controller determines if the read command is for sequential read at block 604.

If the read command received is for a sequential read at block 604, then the HPB entry of the read command is read at block 606. The HPB entry refers to the PBA and the run length of the associated LBA. Furthermore, if the transfer length does not satisfy the run length requirement of the HPB read command, the standard read protocol may occur. However, if the transfer length does satisfy the run length requirement, then the data is retrieved from the data location at block 612 without accessing the FTL table.

However, if the read command is not for a sequential read (i.e., a random, non-consecutive read) at block 604, then the HPB entry of the read command is read at block 608. The controller checks the write buffer table at 610 to request the relevant HPB read buffer table. The data is retrieved from the data location at block 612.

By encoding the HPB entry of the read command with the PBA and run length, sequential reads can be more efficient. By encoding the HPB entry of the read command with a reference to a HPB write buffer, non-sequential reads can be more efficient.

In one embodiment, a data storage device comprises: a memory device; and a controller coupled to the memory device, wherein the controller is configured to: create a host performance booster (HPB) read buffer table, wherein the HPB table includes logical block addresses (LBAs), physical block addresses (PBAs), and run lengths for the PBAs; and deliver the HPB read buffer table to a host device. The controller is further configured to receive a HPB read command, wherein the HPB read command includes an LBA, a transfer length, and an HPB entry. The HPB entry includes the PBA for the LBA and the run length for the PBA. The HPB entry includes coherency information. The controller is further configured to read the data from the memory device using the HPB entry without checking a flash translation layer (FTL) table. The controller is further configured to receive a write buffer command table and store the write buffer command table in the memory device. The controller is further configured to receive a HPB read command, wherein the HPB read command includes an LBA, a transfer length, and an HPB entry, and wherein the HPB entry references a location in the write buffer command table. The HPB entry is encrypted, and wherein the run length is not encrypted.

In another embodiment, a data storage device comprises: a memory device; and a controller coupled to the memory device, wherein the controller is configured to: receive a host performance booster (HPB) read command, wherein the HPB command includes a run length that is not encrypted; review encoded information from HPB command; retrieve requested data; and deliver the requested data to a host device. The encoded information includes a physical block address (PBA). The run length is greater than 4K. The encoded information references an HPB write buffer table. The HPB write buffer table is disposed in the data storage device. The controller is further configured to create a HPB read buffer table.

In another embodiment, a data storage device comprises: a memory device; a controller coupled to the memory device; and means to create a host performance booster (HPB) read buffer table, wherein the HPB read buffer table includes logical block address (LBA) information, physical block address (PBA) information, and run length. The data storage device further comprises: means to receive a HPB read command; and means to receive an HPB write command buffer table. The HPB read command contains an LBA, a transfer length, and an HPB entry. The HPB entry contains a PBA and a run length. The HPB entry contains a reference to the HPB write command buffer table. The data storage device further comprises means to calculate a run length for a PBA entry.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
create a host performance booster (HPB) read buffer table, wherein the HPB table includes logical block addresses (LBAs), physical block addresses (PBAs), and run lengths for the PBAs, wherein each LBA corresponds with a PBA, and wherein each run length corresponds with a number of sequential PBAs remaining;
determine that a transfer length is equal to or greater than the run length of the PBA, wherein each run length corresponds with a number of sequential PBAs remaining; and
deliver the HPB read buffer table to a host device.

2. The data storage device of claim 1, wherein the controller is further configured to receive a HPB read command, wherein the HPB read command includes an LBA, a transfer length, and an HPB entry.

3. The data storage device of claim 2, wherein the HPB entry includes the PBA for the LBA and the run length for the PBA.

4. The data storage device of claim 3, wherein the HPB entry includes coherency information.

5. The data storage device of claim 2, wherein the controller is further configured to read the data from the memory device using the HPB entry without checking a flash translation layer (FTL) table.

6. The data storage device of claim 1, wherein the controller is further configured to receive a write buffer command table and store the write buffer command table in the memory device.

7. The data storage device of claim 6, wherein the controller is further configured to receive a HPB read command, wherein the HPB read command includes an LBA, a transfer length, and an HPB entry, and wherein the HPB entry references a location in the write buffer command table.

8. The data storage device of claim 7, wherein the HPB entry is encrypted, and wherein the run length is not encrypted.

9. A data storage device, comprising:
a memory device; and
a controller coupled to the memory device, wherein the controller is configured to:
receive a host performance booster (HPB) read command, wherein the HPB command includes a logical block address (LBA) and a transfer length that is not encrypted, wherein the LBA corresponds to a physical block address (PBA);
review encoded information from HPB command;
determine that the transfer length is equal to or greater than a run length of the PBA, wherein each run length corresponds with a number of sequential PBAs remaining;
retrieve requested data using HPB protocol; and
deliver the requested data to a host device.

10. The data storage device of claim 9, wherein the encoded information includes the PBA.

11. The data storage device of claim 10, wherein the run length is greater than 4K.

12. The data storage device of claim 9, wherein the encoded information references a HPB write buffer table.

13. The data storage device of claim 12, wherein the HPB write buffer table is disposed in the data storage device.

14. The data storage device of claim 9, wherein the controller is further configured to create a HPB read buffer table.

15. A data storage device, comprising:
a memory device;
a controller coupled to the memory device, wherein the controller is configured to determine that a transfer length is equal to or greater than a run length of a physical block address (PBA), wherein each run length corresponds with a number of sequential PBAs remaining; and
means to create a host performance booster (HPB) read buffer table, wherein the HPB read buffer table includes logical block address (LBA) information, PBA information, and run lengths for the PBA information, wherein each LBA information entry corresponds with a PBA information entry, and wherein each run length corresponds with a number of sequential PBAs remaining.

16. The data storage device of claim 15, further comprising:
means to receive a HPB read command; and
means to receive an HPB write command buffer table.

17. The data storage device of claim 16, wherein the HPB read command contains an LBA, a transfer length, and an HPB entry.

18. The data storage device of claim 17, wherein the HPB entry contains a PBA and a run length.

19. The data storage device of claim 17, wherein the HPB entry contains a reference to the HPB write command buffer table.

20. The data storage device of claim 15, further comprising means to calculate a run length for a PBA entry.

* * * * *